May 6, 1941.  C. B. SPASE ET AL  2,241,223
AUTOMATIC WEAR TAKE-UP FOR FRICTION CLUTCHES
Filed July 31, 1939
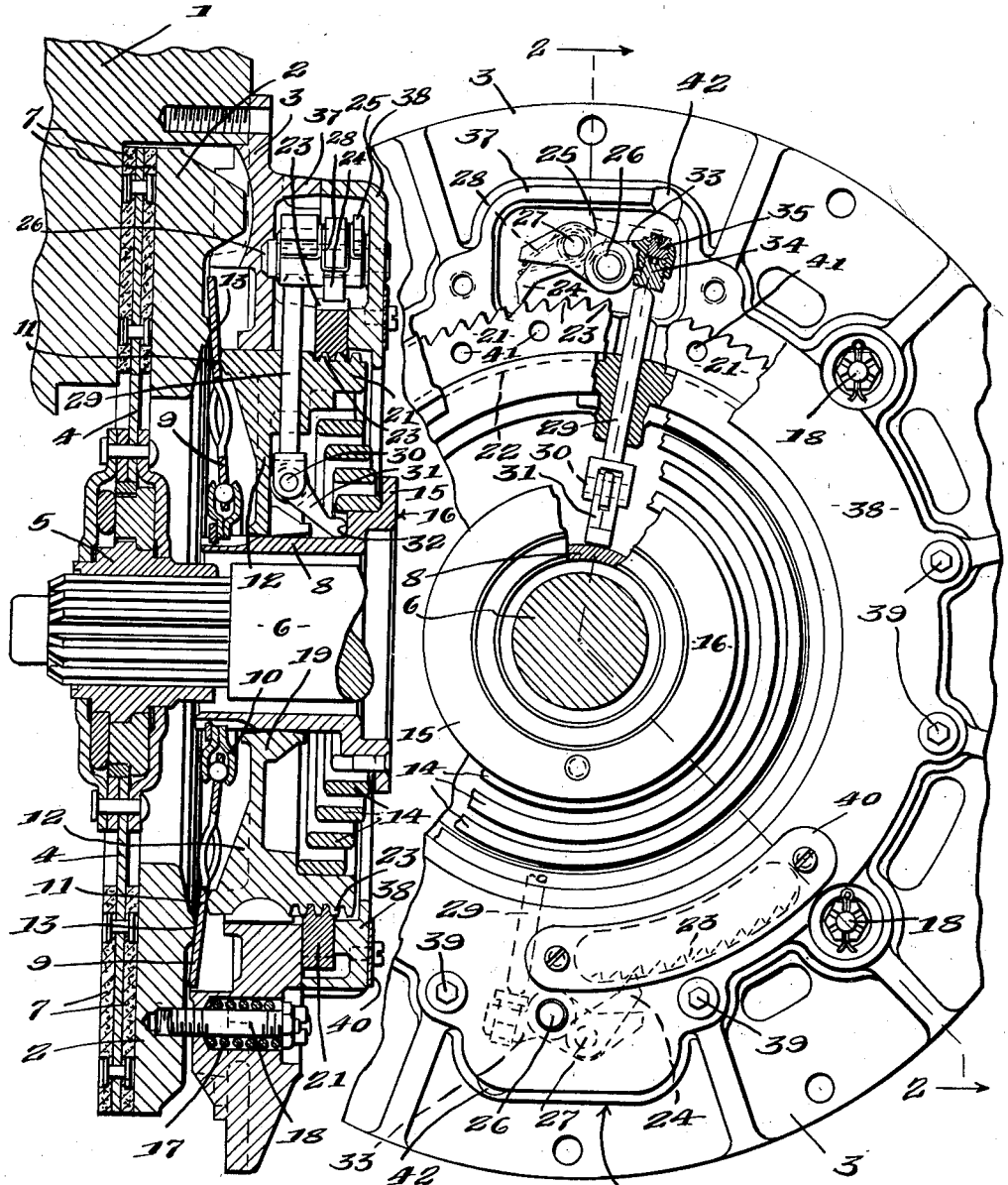
Fig-2-    Fig-1-
Fig-3-    Fig-4-
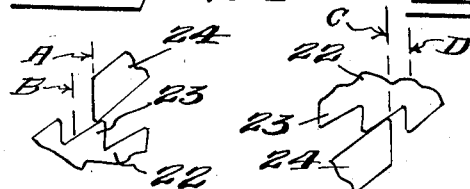
INVENTORS
BY
ATTORNEYS.

Patented May 6, 1941

2,241,223

UNITED STATES PATENT OFFICE 2,241,223

AUTOMATIC WEAR TAKE-UP FOR FRICTION CLUTCHES

Charles B. Spase, Nedrow, and Robert S. Root, Syracuse, N. Y., assignors to W. C. Lipe, Inc., Syracuse, N. Y., a corporation of New York Application July 31, 1939, Serial No. 287,444

9 Claims. (Cl. 192—111)

This invention relates to friction clutches, such as are used in motor vehicles, and has for its object a particularly simple and efficient means operable by the throw-out mechanism of the clutch for automatically taking up for wear on the friction faces of the clutch, of the general type of automatic take-up mechanism described in our pending application, Serial No. 280,994, filed June 24, 1939.

More specifically, it has for its object an automatic take-up mechanism including a ratchet ring coacting with the axially adjustable abutment of the clutch, to shift the abutment axially, and a pawl mechanism operable by the movement of the throw-out sleeve into or from a position beyond its normal starting position, which pawl mechanism extends in a circumferential direction relatively to the abutment or the ring and is so mounted that the centrifugal weights are distributed on opposite sides of the pivot of the pawl mechanism.

It further has for its object an arrangement of pawl mechanism and the connections between it and the throw-out sleeve, whereby the adjusting mechanism is located within a minimum axial length and housed within the back plate structure of the clutch without materially increasing the axial dimension, so that a clutch with this adjusting mechanism may be installed within the space now available in the standard clutch or bell housing.

It further has for its object an arrangement of a plurality of pawl mechanisms so as to centrifugally balance each other and with the pawls so arranged that each travels over a different area or section of the coacting ratchet tooth from the other pawl providing for a fine adjustment with relatively coarse ratchet teeth.

The invention consists in the novel features and in the combinations and constructions hereinafter set forth and claimed.

In describing this invention, reference is had to the accompanying drawing, in which like characters designate corresponding parts in all the views.

Figure 1 is a fragmentary rear elevation, partly in section, of a clutch embodying this invention.

Figure 2 is a vertical sectional view on line 2—2, Figure 1.

Figures 3 and 4 are diagrammatic views illustrating the relation of the pawls to the ratchet teeth or the staggered arrangement of the pawls.

The invention comprises means for automatically compensating for wear of the friction faces of the clutch elements, which compensating means is operable by the throw-out mechanism, when the throw-out mechanism moves beyond or from a position beyond its normal starting position. One of the features of the compensating means is a ratchet and pawl mechanism with the pawl or pawls of said mechanism extending and working in a circumferential direction relatively to the ratchet wheel, which is concentric with the axis of the clutch, with connections operated by the axial movement of the throw-out sleeve of the clutch for actuating the pawl or pawls in said circumferential direction.

As here shown, the ratchet ring is formed with peripheral ratchet teeth and the pawls located in the plane of the ratchet ring and extended circumferentially relative to the ratchet ring.

I designates the driving member of the clutch, which is usually the fly-wheel of the engine of the vehicle. 2 designates a pressure ring forming part of the driving element, it being interlocked with the driving element to rotate therewith. The pressure ring 2 is also shiftable axially relatively to the fly-wheel. 3 is the so-called back plate secured to the fly-wheel.

The driven member includes a disk 4 having a hub 5 usually slidably splined on the clutch shaft 6. The disk 4 has friction disks 7 on opposite sides thereof for coacting with the friction face on the fly-wheel and a friction face on the pressure ring 2.

The throw-out mechanism includes a throw-out sleeve 8 encircling the shaft 6 and usually spaced therefrom, a series of levers 9 extending radially from the inner ends of the sleeve and suitably connected at 10 thereto, said levers being fulcrumed at 11 on the fulcrum member or abutment 12 and pressing at 13 on the pressure ring 2. The clutch is engaged by a spring, as 14, thrusting in opposite directions against the abutment 12 and a collar 15 at the outer end of the throw-out sleeve. The arrangement of this spring in the assembly relatively to the adjusting mechanism is one of the features of this invention.

The throw-out sleeve is actuated by the usual clutch pedal through a fork or yoke shaft, not shown, the fork coacting with or thrusting against the surface 16 at the rear end of the throw-out sleeve.

The clutch here shown is of the push-in type, that is, a clutch that disengages upon the pushing in of the throw-out sleeve, or, in other words, the movement of the sleeve 8 to the left (Figure 2) causes the levers 9 or the inner ends thereof to move to the left, and release the pressure of the levers on the fulcrum 11, thereby permitting the pressure ring 2 to release the driven member or disk 4. The pressure ring 2 is withdrawn to the right (Figure 2) when the throw-out sleeve 8 is moving inwardly to the left, by springs, as the spring 17, interposed between the head of a stud 18 extending through the back plate and threading into the pressure ring, which stud extends through the bottom of the recess in the back plate through which the stud 18 extends. The clutch spring 14 thrusting against the throw-out sleeve 8 moves it to the right when the clutch pedal is released, and hence moves the levers 9 into the position shown in Figure 2, wherein they fulcrum on the fulcrum 11 and transfer the force of the spring 14 to the pressure ring 2, to engage the clutch. The fulcrum member or abutment 12 is arranged concentric with the sleeve 8 or the sleeve 8 extends axially through the abutment 12. The abutment 12 is adjustable axially to take up for wear on the friction disk 7. It is mounted in the back plate and rotates as a unit with the back plate. It is here shown as provided with a hub portion 19 on the periphery of the throw-out sleeve 8. By this clutch construction, the driving member of the clutch and the part of the throw-out mechanism carried thereby, rotate as a unit.

This invention relates to the automatic adjustment of the fulcrum member or abutment 12 to compensate for wear of the friction disks 7, and assembly of the automatic adjusting mechanism in the back plate.

The automatic adjusting means comprises a ratchet ring 21 having screw-threaded engagement at 22 with the abutment 12, the ring encircling the abutment 12 and having peripheral ratchet teeth 23, pawl mechanism carried by the back plate, and for the most part, located in the plane of the ring 21 and extending in a circumferential direction relative to the ring 21, and connections between the pawl mechanism and the throw-out sleeve 8, these connections being located between the inner and outer ends of the abutment 12 and extending radially through the abutment.

24 designates the pawl coacting with the ratchet teeth 23 of the ring 21; 25 the pawl carrier pivoted at 26 between its ends to the back plate 3, the pawl 24 being pivoted at 27 to one arm of the carrier 25 and being yieldingly pressed against the ratchet teeth 23 by a spring 28 interposed between the pawl carrier 25 and the pawl 24. The actuating means between the throw-out sleeve 8 and the pawl carrier coacts with the other arm of the pawl carrier 25. Owing to this arrangement of the pawl carrier and the pawl extending in a circumferential direction relative to the adjusting ring 21, and to the fact that it is pivoted between its ends, the centrifugal weight of the pawl carrier and pawl, during the rotation of the clutch, is distributed, and preferably counterbalanced, thus avoiding adjustments that would otherwise be necessary to compensate for the centrifugal weight, in order to effect efficient working of the pawl 24. The connections between the pawl carrier 25 and the throw-out sleeve 8 are here shown as radial push rods 29 coacting at their outer ends with the pawl carrier 25, these rods being guided in suitable radial passages in the abutment 12 and being pivoted at 30 at their inner ends to thrust links 31 arranged at an inclined angle, and thrusting against a shoulder 32 on the throw-out sleeve 8. The thrust rod 29 and link 31 are located between the inner and outer ends of the abutment 12 and in front of the clutch spring 14.

By this arrangement, the adjusting mechanism may be embodied in an abutment 12 of minimum axial length. This is the feature which permits a clutch with the throw-out mechanism to be installed in the available space within the standard clutch or bell housing.

The thrust rods 29 are also located forward of the adjusting nut or ratchet ring 21. This is accomplished by locating the arm 33 of the pawl carrier 25 with which the thrust rod 29 coacts, offset forward, as seen in Figure 2, from the plane of the arm of the pawl carrier to which the pawl 24 is pivoted. The outer ends of the thrust rod 29 coacts with adjusting thrust plugs 34 threading into the arm 33 of the pawl carrier 25, and these are held in their adjusted position by a lock-screw or plug 35.

The spring 28 is a torsion spring coiled about the pivot 27 of the pawl 24 with one end pressing against the pawl 24 and the other end against the pawl carrier 25, so that this spring acts and re-acts in opposite directions on the pawl 24 and the pawl carrier 25, and hence tends to rock the pawl carrier 25 about its pivot 26 in a clockwise direction (Figure 1) causing the arm 33 of the pawl carrier to press radially inward against the radial rod 29 and cause it to follow up the throw-out sleeve 8, when the throw-out sleeve is shifted to the right, by the clutch spring to engage the clutch.

There are preferably a plurality or duplicate adjusting mechanisms located to centrifugally balance each other, and in the illustrated embodiment of the invention, there are two such mechanisms located diametrically opposite each other, as seen in Figure 1. The pawls 24 of these two mechanisms are so located that they travel at the same time over different areas or sections of the ratchet teeth 23 of the ring 21.

As seen in Figures 3, 4, while one of these ratchet teeth is traveling during the reciprocation of the pawl over the portion of the ratchet tooth with which it coacts between the lines A—B, the diametrically opposite pawl 24 is traveling over the area of the tooth with which it coacts between the lines C—D.

By this arrangement, comparatively coarse ratchet teeth may be used and a relatively fine adjustment automatically effected, and also any retrograde movement of the ratchet teeth 21 under the rotation of the clutch would be stopped before it developed to an appreciable extent, by the pawl working in the position shown in Figure 4, that is, the pawl 24 that overlaps the tooth farther than the other pawl is a comparatively short distance from the next tooth so that there is a small place between it and the next tooth, as illustrated by the lines C—D Figure 4. The distance between the lines C—D is illustrative of the amount of retrograde movement that the ratchet wheel might take before being stopped, and this is a comparatively small movement.

The back plate is formed with diametrically opposite housings 37 in which the carriers 25 and pawls 24 are located and also provided with a removable cover 38, in the general form of a ring secured to the body of the back plate 3, as by bolts 39. The heads of the bolts 18 against which the spring 17 acts to withdraw the pressure ring 2, when released, are exposed on the rear side of the back plate 3 outside of the annular portion of the housing 37. The cover 38 is provided with removable arcuate plates 40 for giving access to the pawls 24 and the contiguous ratchet teeth 23, and for permitting the initial hand adjustment of the abutment 12 by the ring 21, the ring 21 being formed with suitable holes 41 for receiving a tool to turn the ring 21 by hand. Also, the housing 37 is provided with work-holes 42 giving access to the adjusting nuts 31, 35.

When the clutch friction faces wear to such an extent that the throw-out sleeve moves a predetermined extent beyond normal starting position, one or the other of the pawls 24 overreaches or ratchets off from the tooth 23 with which it is engaged and is pressed by its spring into engagement with the ratcheting surfaces of the next tooth. It engages the ratcheting surface of the next tooth at a point removed or spaced from the tooth with which it has just ratcheted out of engagement, leaving a lost motion between the nose of the pawl and the latter tooth. This point is in the line C (Figure 4). Thus, when the clutch throw-out mechanism is again operated to disengage the clutch, that is, when the clutch throw-out sleeve is moved to the left (Figure 2), this lost motion is being taken up before the ratchet wheel or ring 21 is actuated by the pawl. The purpose of this lost motion is to permit the pressure ring 2 to release the driven element of the clutch, or permit the springs 70 to re-act sufficiently to withdraw the pressure ring 2, before one or the other of the pawls actuates the adjusting ring 21, it being borne in mind that this adjusting movement takes place only when wear on the friction faces has developed to such an extent that the throw-out collar starts from a position beyond its normal starting position.

During the normal operation, when the throw-out collar 8 is moved inwardly in its throw-out operation, both pawls 24 merely ratchet or slide idly along the teeth 23 with which they are engaged. As the friction disks 7 wear, the throw-out sleeve gradually assumes a position to the right beyond normal starting position. When the wear develops a predetermined amount, and hence permits the throw-out sleeve 8 to move a predetermined distance to the right beyond normal starting position, one pawl 24 or the other, will slide off the tooth with which it has been engaged, into engagement with the next tooth, so that during the next throw-out operation, the ring 21 will be turned an amount equal to the throw of the pawl 24. The throws of the pawls 24 are less than the length of the ratchet face of one tooth 23. During each throwing-out operation, the thrust rods 29 are shifted radially outward against the re-action of the springs 28 acting on the pawl carriers 25, and when the clutch is again reengaged by the clutch spring 14 thrusting the throw-out collar 16 towards normal position, that is, to the right, the re-action of the springs 28 acting through the pawl carriers 25 and their arms 33 return the thrust rods 29 radially inward, causing the thrust link 31 to follow up and remain engaged with the throw-out sleeve 16 at 32.

Owing to the staggered arrangement of these teeth, as before described, the pawls will alternately act to advance the ring 21.

What we claim is:—

1. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same axially upon relative turning movement of the ratchet ring, pawl mechanism extending in a circumferential direction relatively to the ring and coacting with the ring and including a carrier pivoted to the back plate, and connections between the pawl carrier and the sleeve and operable by the axial movement of the sleeve beyond normal starting position to actuate the pawl.

2. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same axially upon relative turning movement of the ratchet ring, pawl mechanism including a pawl carrier pivoted between its ends to the back plate, a pawl carried by one arm of the carrier coacting with the ratchet ring, the pawl mechanism extending in a circumferential direction relative to the ratchet ring, and connections between the other arm of the pawl carrier and the sleeve operable to rock the carrier on its pivot during axial movement of the sleeve.

3. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same axially upon relative turning movement of the ratchet ring, pawl mechanism including a pawl carrier pivoted between its ends to the back plate, a pawl carried by one arm of the carrier coacting with the ratchet ring, the pawl mechanism extending in a circumferential direction relative to the ratchet ring, and connections between the other arm of the pawl carrier and the sleeve operable to rock the carrier on its pivot during axial movement of the sleeve, the centrifugal weights of the portion of the pawl carrier and the pawl being so relatively distributed on opposite sides of the pivot of the pawl carrier that said centrifugal weights oppose each other.

4. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same axially upon relative turning movement of the ratchet ring, pawl mechanism including a pawl carrier pivoted between its ends to the back plate, a pawl carried by one arm of the carrier coacting with the ratchet ring, the pawl mechanism extending in a circumferential direction relative to the ratchet ring, connections between the other arm of the pawl carrier and the sleeve operable to rock the carrier on its pivot during axial movement of the sleeve, the centrifugal weights of the portion of the pawl carrier and the pawl being so relatively distributed on opposite sides of the pivot of the pawl carrier that said centrifugal weights oppose each other, and a spring interposed between the pawl carrier and the pawl yieldingly pressing the pawl against the ratchet ring.

5. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same axially upon relative turning movement of the ratchet ring, pawl mechanism pivoted to the back plate and extending in a circumferential direction relatively to the ring and coacting with the ring, and connections between the pawl carrier and the sleeve and operable by the axial movement of the sleeve to actuate the pawl, the sleeve extending axially through the abutment, and said connections coacting with the sleeve between the ends thereof and extending radially of the abutment between the inner and outer ends of the abutment.

6. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same axially upon relative turning movement of the ratchet ring, pawl mechanism pivoted to the back plate and extending in a circumferential direction relatively to the ring and coacting with the ring, and connections between the pawl carrier and the sleeve and operable by the axial movement of the sleeve to actuate the pawl, the sleeve extending axially of the abutment, the clutch spring means thrusting in opposite directions against the abutment and the sleeve at the outer end of the latter, and said connections being located between the clutch spring and the abutment and including portions extending radially through the abutment and coacting with the ratchet mechanism.

7. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the axial movement of the sleeve beyond its normal starting position to adjust the abutment axially, said means including a plurality of ratchet and pawl mechanisms spaced circumferentially around the abutment to centrifugally balance each other, the length of the ratchet face of each ratchet tooth being correlated with the length of the movement of the sleeve beyond normal starting position so that the pawls normally idle on the ratchet face of any teeth and ratchet off said ratchet faces onto the ratchet face of the next tooth only when the throw-out sleeve moves beyond its normal starting position, the pawls being so arranged relatively to each other that each travels over a different area of the ratchet faces with which it coacts from that travelled by the other pawl over the ratchet face of the tooth with which it is simultaneously coacting.

8. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same upon relative turning movement of the ratchet ring, pawl mechanism extending in a circumferential direction relatively to the ring and coacting with the ring and including a carrier pivoted to the back plate, connections between the pawl carrier and the sleeve and operable by the axial movement of the sleeve beyond normal starting position to actuate the pawl, and a spring acting in opposite directions on the pawl and the pawl carrier.

9. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement thereof and the force of the spring to engage and disengage the clutch, said parts coacting with the abutment during the engaging of the clutch, the sleeve having a normal starting position and being movable beyond said starting position, as the friction faces of the clutch wear; the combination of means operable by the movement of the sleeve beyond its normal starting position to adjust the abutment axially, said means including a ratchet ring carried by the back plate and held from axial movement and coacting with the abutment to shift the same axially upon relative turning movement of the ratchet ring, pawl mechanism including a pawl carrier pivoted between its ends to the back plate, a pawl carried by one arm of the carrier coacting with the ratchet ring, the pawl mechanism extending in a circumferential direction relative to the ratchet ring, connections between the other arm of the pawl carrier and the sleeve operable to rock the carrier on its pivot during axial movement of the sleeve, and a spring interposed between the pawl carrier and the pawl and acting in opposite directions thereon.

CHARLES B. SPASE.
ROBERT S. ROOT.